Figure 7:
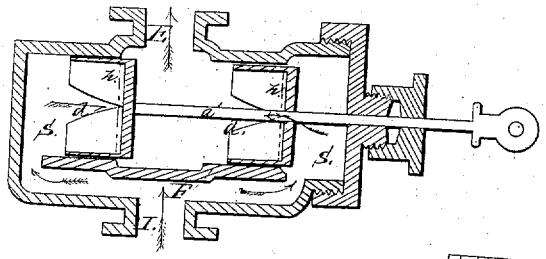

2 Sheets-Sheet 1.

J. & A. Judson,

Governor.

No. 255.

Reissued Jan. 10, 1854.

N. PETERS, PHOTO-LITHOGRAPHER, WASHINGTON, D. C.

2 Sheets-Sheet 2.

J. & A. Judson,

Governor.

No. 255. Reissued Jan 10, 1854.

N. PETERS, PHOTO-LITHOGRAPHER, WASHINGTON, D. C.

UNITED STATES PATENT OFFICE.

JUNIUS JUDSON AND ALFRED JUDSON, OF ROCHESTER, NEW YORK, ASSIGNORS TO JUNIUS JUDSON.

IMPROVED GOVERNOR-VALVE FOR STEAM-ENGINES.

Specification forming part of Letters Patent No. 7,755, dated November 5, 1850; Reissue No. 255, dated January 10, 1854.

*To all whom it may concern:*

Be it known that we, JUNIUS JUDSON and ALFRED JUDSON, of Rochester, Monroe county, New York, have invented a new and Improved Governor-Valve for Steam-Engines, of which the following is a full, clear, and exact description, reference being had to the accompanying drawings, making part of this specification.

The importance of governing the motions of steam-engines under the varying pressure of the steam in the boiler and the varying resistance or load which it must overcome or carry is a problem of great importance, which has long engaged the attention of engineers as a question of economy in the consumption of steam, of efficiency and accuracy in the work to be done by machinery impelled by the engine, and of durability of the engine itself and machinery impelled by it. The speed of an engine at a given pressure of steam and with a given resistance to overcome or load to carry will be constant so long as the pressure of the steam and the resistance or load remain constant; but with the same resistance or load an increase or decrease in the pressure of the steam will increase or decrease the speed of the engine, and with the same pressure of steam the same result will be produced by a decrease or increase of the resistance or load; and as it is not practicable by any known means to maintain a uniform and constant pressure of steam in the boiler, and for most purposes, particularly manufacturing, the resistance or load frequently varies, steam-engines are subjected to vibrations in speed, which, if violent, are injurious to the engine itself and to the machinery impelled by it, and in many cases injurious to the products of the machinery, such as in mills for spinning and weaving, where by a sudden increase of speed the threads are broken and often the machinery injured.

Taking advantage of the well-known fact that with a given pressure of steam the power of an engine can be increased or decreased by varying the size of the aperture through which the steam must pass to the engine, a valve has long since been used to govern the capacity of such aperture or steam-passage, the position of the valve being controlled by a governor—such as the fly-ball governor—so that the said passage should be decreased by the balls under an increased speed of the engine, and vice versa. When any change takes place in the speed of an engine thus governed, either by a variation of the pressure of the steam or by increasing or decreasing the resistance or load, the change is not effected gradually and regularly, but by a series of perturbations, until, finally, the governor and valve settle to a new position, due to the new relations between the power and the resistance, and there remain until another change takes place, either in the power or resistance, or both.

The vibrations of speed above referred to are greater at high than at low speeds, because a given accession of resistance at high speed bears a greater proportion to the whole or entire resistance than the same increase of resistance does to the whole or entire resistance at low speed; and the vibrations and perturbations of speed are aggravated by the greater area of valve-opening that is made by a given resistance at high than at low speed, and, still more, because the difference between the pressure of steam in the boiler and cylinder is greater at high than at low speed. Consequently larger areas are opened or closed by a given change of resistance at high than at low speed, when the areas opened and closed should be smaller.

The object of our invention is to decrease the perturbations of steam-engines caused by any change in the tension of the steam or in the resistance or load, and the more effectually to check any undue increase or decrease in the motion of the engine than can be effected by any plan known prior to our invention; and to this end the nature of our invention consists in making the steam passage or passages controlled by the governor valve or valves, so that the area or sum of the areas of the passage or passages shall gradually increase in capacity, not only by the amount of motion which uncovers it, but so that the amount of area opened by any given amount of motion shall be gradually greater toward the fully-opened end, by means of which any tendency to increase the motion of the engine shall be checked by reducing the area of the steam-passage to a greater extent than would be due to the amount of motion given to the valve, and the tendency to decrease the motion of the engine shall be checked by increasing the area of the steam-passage to a greater extent than would be due to the motion of the valve alone imparted by the governor under the change of speed of the engine. When the governor and valve work with effect, the pressure per square inch upon the piston is less than in the boiler, and reducing the load or resistance reduces the pressure in the cylinder, producing less resistance to the passage of steam from the boiler to the cylinder, and the area of valve-opening necessary to pass a given amount of power or steam is much less with the light than with the heavy load, and an increased capacity of opening from the closed to the open position of the valve, more than is due to the opening motion of the valve, is necessary, so that equal amounts of resistance being successively added (as load to the engine) shall cause the valve to open successive and regularly-increasing areas until the valve is fully open or the load complete; and our invention also consists in placing a spring in the set-screw or its equivalent, the power or tension of which is adjustable, and after the valve is secured from friction, or a contact of surfaces by adjusting the set-screw without the use of the spring, the power or tension of the spring may then be increased nearly equal to the highest pressure of steam upon the cover of the openings. When they are nearly closed and the engine at its highest speed, and when the pressure upon the cover of the opening diminishes either by a decreased pressure of steam in the boiler or by the opening of the valve as the load increases, the spring will cause the cover of the openings to recede from the valve-seat, and an increased flow of steam will pass to the cylinder by a less decrease of motion or drop of the governor-balls than would occur without its use, thereby reducing the range of speed necessary to work the valve to the least possible limits. Its operation when the steam-pressure in the boiler increases or the load diminishes is reversed, for the spring will recede and the valve-cover come back to its original opening and adjustment; and, finally, our invention consists in the employment of a valve-lever adjustable to the stem of the valve, in combination with a fixed indicator, for the purpose of setting the valve in any required position without opening the valve-box.

Figure 4:
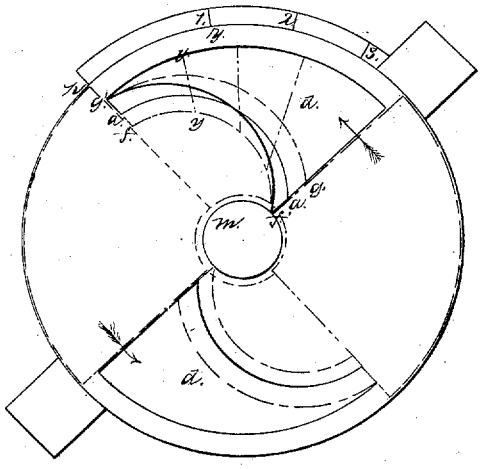

The form of opening which we find most advantageous is that delineated in Figure 4, where the valve (represented by the quadrantal spaces inclosed in long dots) closes over the apertures *d d* in the direction of the arrows, and in opening moves in the reverse direction in the way indicated by the numerals 1, 2, and 3, placed on the indicator-arc. In cases where certain portions of the machinery are never detached, the narrower or angular end of the opening may be closed or filled up to the extent indicated by the dotted line *y y*, Fig. 4, without very serious detriment to the action of the valve; but this change we do not recommend. We find that in larger engines the narrower end of the openings need not be drawn so near to a point as in small ones. Where long lines of shafting or other machinery involving much constant friction is attached to the engine, the plane line *a a* may be replaced by a line giving a larger opening, which may vary as far from *a a* as the dotted line *f f′*, and in cases of extraordinary lightness and ease of running the line *a a* may, on the other hand, vary so as to narrow the opening to the limit of the dotted line *g g′*, and with the extreme of ease the line may vary or run from *f′* to *g′*.

Figure 6:
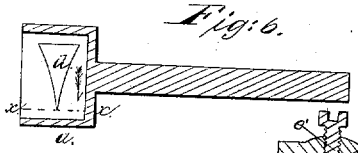

Though we prefer the disk form for the valve-seat, yet we shall sometimes construct our valves, as seen at *d*, Figs. 6 or 7, so that their seats and openings shall be in the curved sides of a cylinder or cone; but the principle on which the open spaces are formed will still be the same, and the same law of opening will be observed when the valves are made to slide instead of revolving. In Fig. 6 the cylinder *a* turns in the direction of the arrows to open the aperture *d*, and from the narrower to the wide end over the edges *x x* of the outer cylinder. Besides the irregular and dangerous action of the engine arising from the too rapid opening of the governor-valve at one time and too slow on opening at another, there is with the valves in common use another source of sluggishness or disturbance in action requiring to be corrected, and demanding, for the prevention of vibration, a combination of the form of opening with adequate means to render the correction prompt, so as to make the movements of the valve over its openings coincide in time with the demands of the work. The resistances created by the friction of a valve upon its seat or bearing and on the packing, which prevents leaking of steam, and by its adhesion to the sides of the tube or box within which it is made to work, require, ordinarily, a considerable force to overcome them. They will require a decided increase of speed in the governor-balls before their expansive force will begin to offer to open them, and an equal diminution of speed to allow them to descend when resisted by the causes just pointed out. These causes render all engines which rely on governor-valves thus imperfect liable to "jumping" or sudden and violent vibrations when the quantity of machinery to be driven is suddenly varied, and the best form of valve-opening will not wholly relieve that part of the vibration which results from these impediments.

Figure 1:
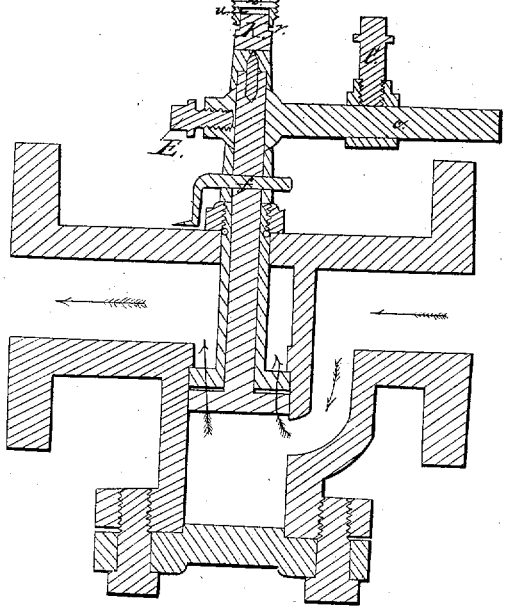
Figure 5:
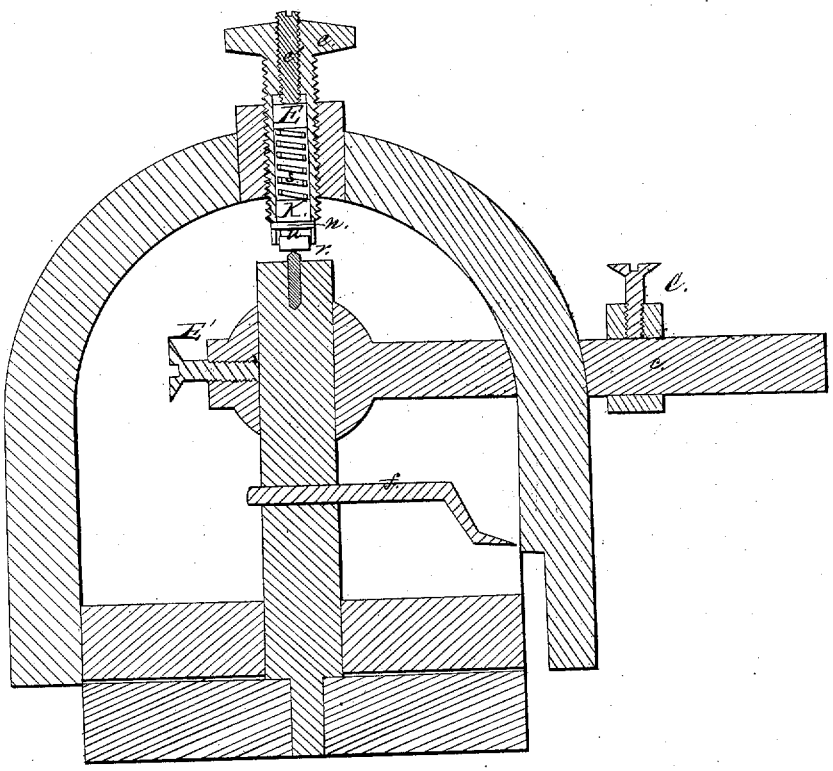

The manner in which we prefer to diminish the friction of the valve is seen in Figs. 1 and 5, where *e′* is a set-screw to operate against the spindle of the valve. In order to provide against a contact of surfaces (which would produce friction under a pressure of steam) and to insure its free action, whether more or less closed, we make the shaft of the screw *e* hollow, place within it the follower E, acting on a spring, S, which in turn acts on the piston K. This piston has a short slot, *u*, through which passes the pin *n*, allowing a very limited movement of the piston. When pressed fully out by the spring, the piston projects a short distance, *r*, beyond the end of the screw. The adjusting-screw *e'* forces forward the follower E, compresses the spring S, Figs. 1 and 5, to such a degree of tension as to enable it barely to yield to the pressure of steam, and brings the valve nearly in contact with its seat, when it covers the whole opening, (the steam being at its greatest pressure,) but which will raise it slightly away from its seat as the valve opens; and when the effective pressure tending to keep it to its seat is no longer felt, as the effective pressure diminishes, the valve will recede from its seat, giving a greater flow of steam through the openings in exact proportion as the pressure decreases in the boiler, or as it is relieved from pressure by opening when more machinery or resistance occasions a lowering of speed in the engine.

In order to make the range of motion of the governor-balls most advantageous for the prompt and efficient opening and closing of the valve, we confine their movements to the higher parts of the arcs through which they are capable of rising.

It being well known that the time in which a conical pendulum will revolve is determined by the vertical distance of the balls below their point of suspenion, we so calculate the length of the suspending-rods as to make the balls rise with the speed which they will have when the engine runs at the working rate—about forty degrees from their perpendicular position—and we allow them when running with the greatest speed to rise as high as seventy or seventy-five degrees. We find that as the centrifugal force of the balls when they expand forty-five degrees is equal to their gravitating force, the higher range at which the balls revolve will give them a steadier motion or action on the valve than the lower; and we also find it most advantageous to let the whole governing power of the balls be confined to a range of fifteen or twenty degrees—say between fifty and seventy degrees of elevation—so that when at the former height the valve shall be at its limits of widest opening, and at the latter shall be at a nearly full closure.

We so arrange the length of the rods of our governor and the relation of the arms of the governing-lever that an acceleration of about four per cent. above the prescribed speed of the engine shall nearly close the governor-valve, and a falling off to the same extent below the prescribed speed shall leave the valve wide open. The manner of effecting this adjustment is to slide the wrist C on the valve-lever *c*, Figs. 1 and 5, to such a distance from the valve-stem as will make the prescribed range of motion of the balls move the valve over the whole range of the valve-opening required at the time.

To determine the range which the valve shall take over the opening, the valve-lever *c*, Figs. 1 and 5, is furnished with a set-screw, E', whereby its position on the valve-stem may be changed, so that when the governor-governor-balls are pefectly at rest the valve-opening shall be either wholly uncovered or but partially so, according as the whole power of the engine or only a certain part of it is to be brought into operation.

For the purpose of adjusting the lever *c* so as to give the valve the required set according to the quantity of work which the engine is intended to perform, the valve-stem is furnished with an indicator, *f*, which shows the amount of opening at every position, whether the valve-lever be set in one position or another on the stem. This indicator, in combination with the adjustable valve-lever, is likewise useful in regulating the amount of opening of the valve according to the pressure of steam which is intended to be maintained in the boiler while the amount of work is constant. It is convenient (but not indispensable) that the number of valve-openings in the same disk, as seen in Fig. 4, should be confined to two. The same amount of space with a like disposition in regard to the openings of the valve (with increasing rapidity the wider it opens) may be preserved into whatever number of parts the open space is distributed. It will be observed that the arcs *f f'*, *a a*, and *g g'* are not portions of perfect circles, but that the curvature has a shorter radius near the center *m* of the valve seat or face than near the periphery *p*. If the opening be divided into three or more parts, the rapidity of increase in the rate of opening may be made greater than when the whole of the space is distributed in two openings only; but an opening in which the length should be materially less in proportion to the width than is seen in Fig. 4 would be objectionable, on account of the greater variation which would be occasioned by looseness in the joints of the levers and connecting-rods, or which might result from a jar or shake of the engine.

In Fig. 6 is given a modification of valve in which the opening *d* is formed in a curved surface, and to avoid the friction which would be produced on its seat two opposite openings may be made in the sides of the cup-shaped valve *a*.

In Fig. 7 two valves, V V, placed on a common valve-rod, *a'*, are made to slide in a cylinder or box, F. The steam enters through I, divides into two currents, and passes into the steamways S S, whence it escapes whenever the valve is drawn into such a position that an opening is made between the edge *h* of the cylinder or box containing the valve and the top of the valve itself into the steam-passage *d*. It then passes along the opening E into the cylinder of the engine. In this case the openings may be in a cup-shaped valve, and to avoid friction may be formed in opposite-curved sides. The effect is to counteract or compensate for the friction which would be produced if the valve were not counterpoised.

Figure 3:
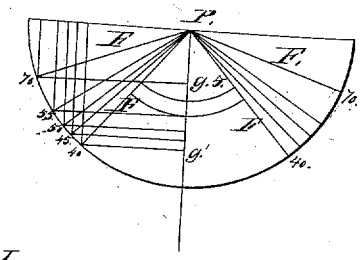

In Fig. 3 we have indicated by the position of the governor-arms F40°, F70°, &c., the range generally found to act most advantageously on a frictionless valve having openings of the charcter of those herein described.

The lines P*g'* and 40°*g'* indicate, respectively, the gravitating force and the centrifugal force when the balls are at the lowest limit of their range, and the lines P*g*5 and *g*5 70° show the relation of the same forces to each other when the balls are at their highest range.

Figure 2:
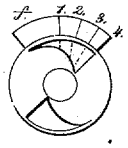

In Fig. 2 is given the card of our indicator *f*, Fig. 1, so divided as to denote the proportional part of the space opened by the valve. It is not an index of the mere movement of the valve, nor is it solely or principally designed to mark that movement, but to make the opening and enable the engineer to adjust the amount of opening for his several purposes, as above set forth, and without requiring him to take the cap from the valve-box.

We do not wish to be understood as limiting our claims to the special form of valve-opening above described, as the form may be greatly varied and yet act upon the principle herein specified as constituting the chief characteristics of our invention; nor yet to limit ourselves to the form of the aperture or apertures, as the same end may be obtained on the same principle by the joint form of the opening or openings and valve governing the same; nor do we wish to limit our invention to the making of such governor-valve with the aperture or opening thereof on the principle herein specified throughout the whole range of motion, as in many instances it may be advantageously employed with the said principle acting only on a part of its range of motion where engines are employed under such circumstances that they will not be exposed to serious perturbations above or below a certain range; but we do not wish to be understood as claiming, broadly, the making of the apertures of governor-valves of capacities varying independently of the range of motion of the valve, as the well-known throttle-valve and valves with circular apertures have not a constant increase or decrease of capacity proportioned to the range of motion.

What we do claim as our invention, and desire to secure by Letters Patent, is—

1. Making the opening or openings controlled by the governor-valves of steam-engines of gradually-increasing capacity from the closed toward the open position, substantially in the manner and for the purpose specified.

2. Interposing a spring between the valve-cover and the set-screw or its equivalent, which determines or sets the position of the face of the valve to its seat, so that the tension of the said spring shall resist the pressure of the steam on the valve-cover, and thereby produce an increased flow of steam to the cylinder. substantially as specified.

3. The employment of the valve-lever adjustable to the stem of the valve, in combination with a fixed indicator, substantially as specified, for the purpose of setting the valve in any required position without opening the valve-box, as set forth.

JUNIUS JUDSON.
ALFRED JUDSON.

Witnesses:
H. PRATT,
JAMES JUDSON.